(12) United States Patent
Teixeira

(10) Patent No.: US 10,480,409 B2
(45) Date of Patent: Nov. 19, 2019

(54) COMPRESSED AIR ENERGY STORAGE AND RECOVERY SYSTEM AND METHOD WITH CONSTANT VOLUME HEATING

(71) Applicant: IFP Energies nouvelles, Rueil-Malmaison (FR)

(72) Inventor: David Teixeira, Rueil-Malmaison (FR)

(73) Assignee: IFP ENERGIES NOUVELLES, Rueil-Malmaison (FR)

(*) Notice: Subject to any disclaimer, the term of this patent is extended or adjusted under 35 U.S.C. 154(b) by 0 days.

(21) Appl. No.: 15/566,614

(22) PCT Filed: Apr. 12, 2016

(86) PCT No.: PCT/EP2016/058001
§ 371 (c)(1),
(2) Date: Oct. 13, 2017

(87) PCT Pub. No.: WO2016/166095
PCT Pub. Date: Oct. 20, 2016

(65) Prior Publication Data
US 2018/0094581 A1    Apr. 5, 2018

(30) Foreign Application Priority Data
Apr. 13, 2015   (FR) ..................... 15 53200

(51) Int. Cl.
*F02C 6/16*  (2006.01)
*F03D 9/17*  (2016.01)
(Continued)

(52) U.S. Cl.
CPC ............... *F02C 6/16* (2013.01); *F01D 25/10* (2013.01); *F02C 1/05* (2013.01); *F03D 9/17* (2016.05);
(Continued)

(58) Field of Classification Search
CPC ...... F02C 6/16; F02C 1/05; F02C 1/04; F01D 25/10; F03D 9/17; F05D 2240/40; F05D 2260/42; Y02E 60/15
(Continued)

(56) References Cited

U.S. PATENT DOCUMENTS

2007/0255459 A1   11/2007   Althaus
2010/0218500 A1*  9/2010   Ruer .................... F01K 3/12
                                                      60/659
(Continued)

FOREIGN PATENT DOCUMENTS

EP    2447501 A2    5/2012
EP    2530283 A1    12/2012
(Continued)

OTHER PUBLICATIONS

International Search Report for PCT/EP2016/058001 dated Jun. 13, 2016; English translation submitted herewith (7 pages).

*Primary Examiner* — Hoang M Nguyen
(74) *Attorney, Agent, or Firm* — Fitch, Even, Tabin, & Flannery LLP

(57) ABSTRACT

The invention is a compressed gas energy storage and recovery system and method, of AACAES type. The system and the method according to the invention heats at constant volume stored compressed gas to increase the pressure of the stored compressed gas.

14 Claims, 1 Drawing Sheet

(51) Int. Cl.
*F01D 25/10* (2006.01)
*F02C 1/05* (2006.01)

(52) U.S. Cl.
CPC ...... *F05D 2240/40* (2013.01); *F05D 2260/42* (2013.01)

(58) Field of Classification Search
USPC .................................. 60/650, 659, 682–684
See application file for complete search history.

(56) References Cited

U.S. PATENT DOCUMENTS

| | | | |
|---|---|---|---|
| 2010/0251711 A1* | 10/2010 | Howes | F01K 3/06 60/659 |
| 2011/0100213 A1* | 5/2011 | Finkenrath | F02C 1/02 95/92 |
| 2011/0100611 A1* | 5/2011 | Ohler | F01K 3/00 165/104.28 |
| 2014/0008033 A1* | 1/2014 | Howes | F28D 20/0056 165/10 |
| 2014/0060051 A1* | 3/2014 | Ohler | F01K 3/12 60/652 |
| 2015/0000248 A1 | 1/2015 | del Omo | |
| 2015/0260463 A1* | 9/2015 | Laughlin | F02C 1/10 165/10 |

FOREIGN PATENT DOCUMENTS

| | | | |
|---|---|---|---|
| SU | 1097816 A1 | 6/1984 | |
| WO | 2005/122389 A1 | 12/2005 | |
| WO | 2011/053411 A1 | 5/2011 | |

\* cited by examiner

COMPRESSED AIR ENERGY STORAGE AND RECOVERY SYSTEM AND METHOD WITH CONSTANT VOLUME HEATING

CROSS REFERENCE TO RELATED APPLICATION

Reference is made to International Application No. PCT/EP2016/058001 filed Apr. 12, 2016, which is incorporated herein by reference in its entirety.

BACKGROUND OF THE INVENTION

Field of the Invention

The present invention relates to compressed air energy storage (CAES). In particular, the present invention relates to an AACAES (Advanced Adiabatic Compressed Air Energy Storage) system in which storage of the air and storage of the heat generated is provided.

Description of the Prior Art

The political will to reduce greenhouse gases, or even the desire to reduce the energy dependence on fossil energies, is resulting in an increase in the share of renewable energies in the energy mixes. These renewable energies can be wind turbines and/or solar (photovoltaic or thermodynamic) systems. The main defects with these systems are their fluctuations over time and the independence between production and need.

For wind turbines, for example, the wind may be present when there is no need for consumption and absent at times of need. It is also possible for the wind to vary about a value and lead to a fluctuating electrical production that is problematical for the electrical network.

The introduction of intermittent renewable energies into the energy mix does not pose a problem if the network is robust, and if the uncontrollable intermittent energy represents only a small portion of the energy. In the case of a high degree of intermittent energies, backup energy production must be present on the network. Now backup energy production systems are, for economic reasons, often greenhouse gas-producing systems. If the share of the intermittent energies becomes significant, fluctuations can occur in the network and a time imbalance between the supply and the demand can occur. This imbalance is due to the fact that, even if the annual consumption is satisfied by the production, there may be a time-lag between the moment of production of the energy and the consumption need.

In order to overcome this difficulty, several solutions have been proposed, including energy storage. The goal is to store the electricity when it is produced, then restore it at times of need. Since the electricity cannot be stored directly, it is first of all necessary to transform it. This transformation can be chemical, electrochemical or mechanical. For example, this transformation can be a transformation into mechanical energy in the form of compressed air and/or of heat.

In a compressed air energy storage (CAES) system, the energy that is to be used at another time is stored in compressed air form. For the storage, an energy, notably electrical, drives air compressors, and for the reclamation, the compressed air drives turbines, which can be linked to an electrical generator. The efficiency of this solution is not optimal because a portion of the energy of the compressed air is in the form of heat which is not used. In effect, in the CAES methods, only the mechanical energy of the air is used, that is to say that all the heat produced during the compression is rejected. Furthermore, the efficiency of a CAES system is not optimal, because the system requires the stored air to be heated to perform the expansion of the air. In effect, by way of example, if the air is stored at 8 MPa (80 bar) and at ambient temperature and if there is a desire to recovery the energy by an expansion, the decompression of the air will follow an isentropic curve from the initial storage conditions (approximately 8 MPa and 300 K). The air is therefore cooled to unrealistic temperatures (83 K, or −191° C.). It is therefore necessary to reheat it, which can be done using a gas burner, or other fuel.

Several variants of this CAES system currently exist. The following systems and methods can in particular be cited:
ACAES (Adiabatic Compressed Air Energy Storage) in which the air is stored adiabatically at the temperature due to the compression. However, this type of system requires a voluminous and costly specific storage system.
AACAES (Advanced Adiabatic Compressed Air Energy Storage) in which the air is stored at ambient temperature, and the heat due to the compression is also stored in a heat storage system TES (Thermal Energy Storage). The heat stored in the TES is used to heat the air before its expansion.

When the implementation of the compressed air energy storage has several compression stages, it is possible to envisage storing the heat from the intermediate compression stages in a heat-dedicated system; and storing the hot air output from the last compressor in a pressurized reservoir. An implementation between ACAES and AACAES is thus obtained.

Refinements of the AACAES systems have focused on the production of the heat storage system TES by use of a fixed reservoir of heat storage material. Another solution envisaged for the heat storage system TES using a heat transfer fluid making possible storing the heat derived from the compression to restore it to the air in a form before the expansion by use of heat exchangers. For example, patent application EP 2447501 describes an AACAES system in which oil, used as heat transfer fluid, circulates in a closed loop to exchange heat with the air. Moreover, the patent applications EP 2530283 and WO 2011053411 describe an AACAES system in which the heat exchanges are performed by a heat transfer fluid circulating in a closed circuit with the closed circuit comprising a reservoir of heat transfer fluid.

The compression and expansion devices do not provide high efficiency. This is why with the efficiency of the compression and expansion devices it is not possible to recover, during expansion, all the energy introduced during compression.

SUMMARY OF THE INVENTION

To increase the quantity of energy that is recovered, the invention provides a compressed gas energy storage and recovery system and method, of the AACAES type. The system and the method according to the invention implement heating while at constant volume of the stored compressed gas, which makes possible increasing the pressure of the stored compressed gas, which provides a better efficiency system and method.

The invention relates to a compressed gas energy storage and recovery system comprising at least one compression device for compressing the gas, a storage for the compressed gas, at least one device for expanding the compressed gas capable of generating energy, and a heat exchange between the compressed gas and a heat transfer fluid. The system further comprises a heater for heating the stored compressed gas at constant volume.

According to the invention, the constant volume heater comprises a heat exchanger disposed between the stored compressed gas and the heat transfer fluid.

According to a variant embodiment of the invention, the storage for the compressed gas comprises at least one reservoir of substantially cylindrical form comprising at least one inner and/or outer cylinder in which the heat transfer fluid circulates.

Advantageously, the heat exchanger disposed between the compression device and the storage for the compressed gas is a staged heat exchanger capable of storing at least the heat transfer fluid at different temperatures with the constant volume heater being capable of heating the compressed gas successively by the heat transfer fluid which is stored at the different temperatures.

According to an embodiment of the invention, the constant volume heater is incorporated in the compressed gas storage.

Alternatively, the constant volume heater comprises at least one constant volume heating chamber, which is external to the compressed gas storage.

According to a feature, the constant volume heater comprises a heat exchanger with an external heat source.

According to one aspect, the compressed gas storage has a plurality of storage volumes connected to one another.

According to a feature, the compression device is reversible permitting use as an expansion device.

Preferably, the system comprises a plurality of compressors between which are disposed heat exchangers, and a plurality of expansion devices between which are disposed heat exchangers.

Advantageously, the heat exchangers provided are constant pressure heat exchangers.

Furthermore, the invention relates to a compressed gas energy storage and a recovery method, in which the following steps are performed:

a) compressing a gas;
b) cooling the compressed gas by heat exchange with a heat transfer fluid;
c) storing the cooled compressed gas;
d) heating the stored compressed gas at constant volume; and
e) expanding the heated compressed gas to generate energy.

According to the invention, the step of heating the gas at constant volume is performed with the heat transfer fluid.

Advantageously, for the step of heating the gas at constant volume, the heat transfer fluid is circulated in a compressed gas storage reservoir of substantially cylindrical form.

According to an embodiment of the invention, the step of heating the gas at constant volume is performed in a compressed gas storage.

Alternatively, the step of heating the gas at constant volume is performed in a constant volume heating chamber external to a compressed gas storage.

According to a feature, the step of heating the gas at constant volume is performed at least partly by using an external heat source.

According to an aspect of the invention, the method comprises a step of heating the compressed gas by use of a heat transfer fluid before the expansion step.

Preferably, the compression and cooling steps are repeated by a plurality of compression devices and of heat exchangers with the heat transfer fluid and the expansion steps being repeated by a plurality of expansion devices and heat exchangers with the heat transfer fluid.

Advantageously, the heat transfer fluid is stored.

According to a variant embodiment, the compressed gas is cooled in stages by storing the heat transfer fluid at different temperatures with the constant volume heating step being performed by successive heat exchanges with the heat transfer fluid at different temperatures.

BRIEF DESCRIPTION OF THE DRAWINGS

Other features and advantages of the method according to the invention will become apparent on reading the following description of non-limiting exemplary embodiments, while referring to the figures attached and described herein below.

DETAILED DESCRIPTION OF THE INVENTION

Figure 1:
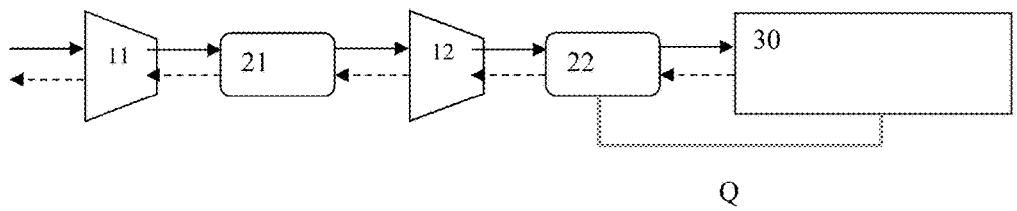
FIG. 1 illustrates an energy storage and recovery system according to an embodiment of the invention.

The present invention relates to a compressed gas energy storage and recovery system equipped with a heat storage (AACAES). In this implementation, the air is stored cold and can be stored at constant volume. The system according to the invention comprises:

at least one gas compressor, and preferably several stages of gas compressors. The gas compressors can be driven by a motor, notably an electric motor, at least one storage (also called reservoir) for the gas compressed by the gas compressor. The compressed gas storage can be a natural or manmade reservoir (for example an underground cavity). The compressed gas storage can be on the surface or underground. Furthermore, it can be formed by a single volume or by a plurality of volumes which may be connected to one another, at least one gas expansion device (also called a regulator or a turbine) expands the compressed and stored gas and preferably has several stages of gas expansion devices. The gas expansion devices make generation of energy possible, in particular electrical energy by a generator, a heat exchanger, between the compressed gas and a heat transfer fluid for cooling the compressed gas output from the gas compressors and/or for heating the compressed gas entering the gas expansion devices. Preferably, the heat exchanges are performed at constant pressure. Furthermore, the heat transfer fluid can be liquid or a gas, contain particles or not, and/or contain or not contain capsules of phase-change material. The heat transfer fluid allows the storage of the heat, heaters for heating the stored compressed gas at constant volume to heat the stored compressed gas before its passage through the gas expansion devices. Performing the constant volume heating permits an increase in the temperature and the pressure of the gas before the expansion (the induced increase of the pressure can be deduced in particular from the ideal gas law), which allows for an increase in the energy recovered by the system and the method according to the invention. In effect, when wanting to obtain mechanical energy from a pressurized hot gas through a turbine, it can be considered that the hot temperature corresponds to the available energy and that the high pressure corresponds to the energy recovery potential. Thus, a constant volume heating (with increased pressure) is more advantageous than a constant pressure heating as performed in a heat exchanger. In order to avoid the heat losses, this constant volume heating is implemented just before the recovery of energy during the expansion phase, which corresponds to the end of the storage of the compressed gas.

The terms "staged compression or expansion" are used when a plurality of compression or expansion devices are mounted in succession one after the other in series. The gas compressed or expanded at the output of the first compression or expansion device then passes into a second compression or expansion device, and so on. A compression or expansion device of a plurality of staged compression or expansion devices is called a compression or expansion stage. Advantageously, when the system comprises a plurality of compression and/or expansion stages, a heat exchanger is disposed between each compression and/or expansion stage. Thus, the compressed air is cooled between each compression, which makes it possible to optimize the efficiency of the next compression, and the expanded air is heated between each expansion, which makes it possible to optimize the efficiency of the next expansion. The number of compression stages and the number of expansion stages can be between 2 and 10, preferably between 3 and 5. Preferably, the number of compression stages is identical to the number of expansion stages. Alternatively, the AACAES system according to the invention can contain a single compression device and a single expansion device. According to a variant embodiment of the invention, the compression devices can be reversible, meaning operation of providing both compression and expansion. Thus, it is possible to limit the number of devices used in the system according to the invention, which saves weight and in volume of the system according to the invention. For this variant embodiment, the heat exchanger used between the compression stages can be those used between the expansion stages.

The system according to the invention is operated with any type of gas, in particular air. In this case, the air at the input used for the compression can be taken from the ambient air, and the air at the output after the expansion can be released into the ambient air. Hereinafter in the description, only the variant embodiment with compressed air will be described. However, the system and method are valid for any other gas.

The heat exchange devices make it possible, during the storage of the compressed gas (compression), to recover a maximum of heat deriving from the compression of the gas at the output of the compressors and to reduce the temperature of the gas before the transition to the next compression or before the storage. For example, the compressed gas can go from a temperature higher than 150° C., for example approximately 190° C., to a temperature lower than 80° C., for example approximately 50° C. The heat exchange means make it possible, upon the restoration of the energy, to restore a maximum of stored heat by increasing the temperature of the gas before the transition to the next expansion. For example, the gas can go from a temperature lower than 80° C., for example approximately 50° C., to a temperature higher than 150° C., for example approximately 180° C.

According to a first embodiment of the invention, the heater of the compressed gas at constant volume is incorporated in the compressed gas storage. Thus, the constant volume heating is performed directly in the compressed gas storage reservoir. It is possible to heat a portion (case where the storage is formed by a plurality of storage volumes) or all of the stored compressed gas. The constant volume heating can be performed totally or partially by the heat transfer fluid used in the heat exchanger, and preferably by the heat transfer fluid used in the heat exchanger disposed between the last compression stage and the compressed gas storage. Furthermore, the constant volume heating can be performed partially or totally by an external heat source, for example by a burner. Thus, it is possible to raise the temperature to a temperature higher than the temperature that can be supplied by the heat transfer fluid alone.

FIG. 1 illustrates a non-limiting exemplary embodiment of the first embodiment according to the invention. An AACAES system is illustrated with staged compression devices, comprising two compression stages 11 and 12, and two heat exchangers 21 and 22. According to the example illustrated, the compressors 11 and 12 are reversible and are used also as expansion devices. In this figure, the circulation of the air during the storage of the energy (compression) is represented by a continuous arrow, and the circulation of the air during the recovery of the energy (expansion) is represented by a dotted arrow. The system comprises a compressed gas storage reservoir 30. A first heat exchanger 21 is inserted between the compression/expansion stages 11 and 12. A second heat exchanger 22 is inserted between the second compression stage (first expansion stage) and the reservoir 30. Conventionally, in the energy storage phase (compression), the air is first of all compressed in the first compressor 11, then cooled in the first heat exchanger 21, then compressed in the second compressor 12, and is then cooled in the second heat exchanger 22. The compressed and cooled gas is stored in the reservoir 30. The heating of the compressed gas at constant volume is performed in the storage reservoir 30, by means of a heat exchange Q with the heat transfer fluid of the second heat exchanger 22. The heat transfer fluid of the second heat exchanger 22 is hot following the cooling of the gas compressed in the compression phase. During the recovery of the energy (expansion), the stored compressed gas is therefore first of all heated at constant volume in the reservoir 30 by means of a heat exchange Q with the heat transfer fluid of the second exchanger, then the compressed gas can be heated in the heat exchanger 22 (in particular if all the heat stored in the heat exchanger 22 is not used for the constant volume heating). Next, conventionally, the gas passes through one or more expansion stages (two stages according to the example illustrated in FIG. 1), with heating by the first heat exchanger 21 between the two expansion stages 12 and 11.

The first embodiment is not limited to the example of FIG. 1. Other configurations can be envisaged including a different number of compression and/or expansion stages, the use of two distinct "circuits" for the compression and the expansion, etc.

Figure 2:
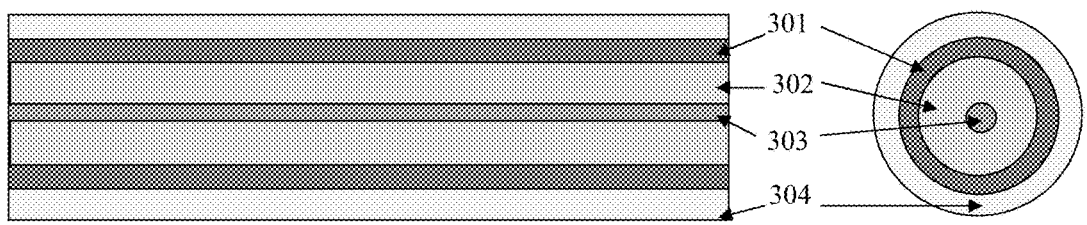
FIG. 2 illustrates an embodiment of a compressed gas storage according to another embodiment of the invention.

According to one design of the reservoir for this first embodiment of the invention, the compressed gas storage reservoir can be formed by at least one outer jacket making it possible to withstand the pressure of the compressed gas after reheating. Furthermore, the reservoir can have one or more heat transfer systems situated at the periphery or at the core of the air reservoir. FIG. 2 illustrates such an exemplary design of the compressed gas storage reservoir according to an axial section and a transverse section. In this example, the air is stored in a reservoir of substantially cylindrical form 302. This cylinder can contain an inner cylinder 303 and/or an outer cylinder 301 in which circulates a heat transfer fluid (single-phase or polyphase) for the purpose of adding heat to the air. The walls of the reservoir make possible withstanding the pressure and ideally promoting the thermal transfers. Finally, a thermal insulation 304 can be added in order to minimize the thermal losses during the heat transfer and after reheating.

Figure 3:
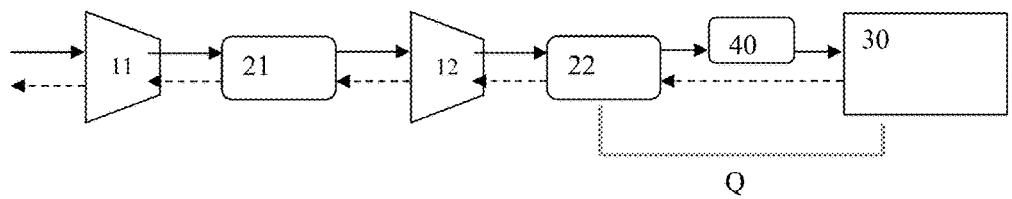
FIG. 3 illustrates a variant embodiment of the system of FIG. 1.

According to a variant embodiment of this first embodiment of the invention, an additional cooler can be installed between a heat exchanger and the compressed gas storage reservoir. This cooler makes it possible to more significantly lower the compressed gas storage temperature so that the pressure variation obtained during the constant volume heating is greater. FIG. 3 illustrates a non-limiting exemplary embodiment of this variant embodiment of the first embodiment. The elements in common with the example of FIG. 1 are not described in detail. The example of FIG. 3 comprises a cooler 40 disposed between the second heat exchanger 22 and the compressed gas storage reservoir 30. Thus, the compressed gas at the output of the second compressor is cooled a first time in the heat exchanger 22 by the heat transfer fluid and then is cooled a second time by the cooler 40. At the output of the cooler 40, the compressed and cooled gas is stored in the reservoir 30. During the recovery of the energy (expansion), the stored compressed gas is first heated at constant volume in the reservoir 30 and by an exchange of heat Q with the heat transfer fluid of the second exchanger and then the compressed gas can be heated in the heat exchanger 22. Next, conventionally, the gas passes through one or more expansion stages (two stages according to the example illustrated in FIG. 3).

This variant of the first embodiment is not limited to the example of FIG. 3. Other configurations can be envisaged including a different number of compression and/or expansion stages and the use of two distinct "circuits" for the compression and the expansion, etc. This variant embodiment can advantageously be combined with the design of the reservoir as illustrated in FIG. 2.

Figure 4:
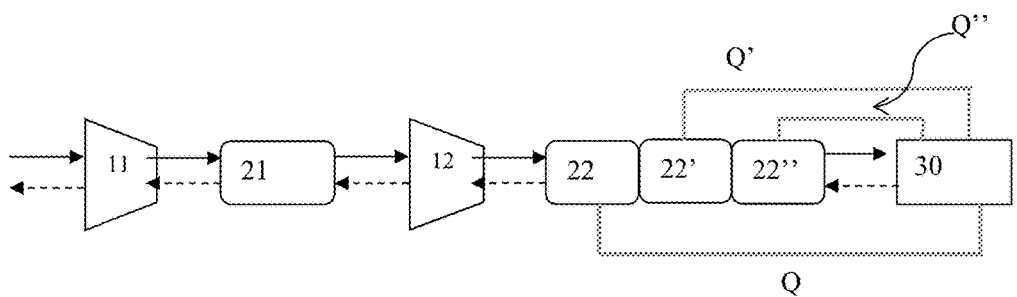
FIG. 4 represents a second variant embodiment of the system of FIG. 1.

According to another variant embodiment of this first embodiment, the heat exchanger disposed between the last compression stage and the compressed gas storage reservoir is a staged heat exchanger. A staged exchanger makes it possible to store the heat in several temperature stages. During the energy recovery phase (expansion), the heat stored in each of these stages, from the coldest to the hottest, is used to heat the air in the reservoir (at constant volume). This implementation provides for a greater rise in the temperature of the gas stored in the reservoir. In order to obtain quasi-fixed or fixed temperature stages, it is advantageous to use a heat transfer fluid with capsules of phase change material (PCM). It may also be advantageous for the fluid that is used to change phase (liquid/gas) during the storage and the reclamation of the heat. FIG. 4 illustrates a non-limiting exemplary embodiment of this variant embodiment of the first embodiment. The elements in common with the example of FIG. 1, and the operation of the common elements of the system, are not described in detail. The example of FIG. 4 comprises a second staged heat exchanger, comprising the successive stages 22, 22' and 22" (the number of stages is non-limiting). During the energy storage phase (compression), the gas at the output of the second compressor 12 is cooled to a first temperature T22 by the first stage of the heat exchanger, then is cooled to a second temperature T22' by the second stage of the heat exchanger 22' with the temperature T22' being lower than the temperature T22. Next, the gas is cooled to a temperature T22" by the third stage of the heat exchanger 22" with the temperature T22" being lower than the temperature T22'. At the output of the third stage 22" of the heat exchanger, the compressed and cooled gas is stored in the reservoir 30. During the recovery of the energy (expansion), the stored compressed gas is first of all heated at constant volume in the reservoir 30 by an exchange of heat Q" with the heat transfer fluid of the third stage 22" of the heat exchanger, then by an exchange of heat Q' with the heat transfer fluid of the second stage 22' of the heat exchanger and then by an exchange of heat Q with the heat transfer fluid of the first stage 22 of the heat exchanger. Next, the compressed gas can be heated in the heat exchanger 22, 22', 22". Next, conventionally, the gas passes through one or more expansion stages.

This variant of the first embodiment is not limited to the example of FIG. 4. Other configurations can be envisaged including a different number of compression and/or expansion stages and using two distinct "circuits" for the compression and the expansion, etc. This variant embodiment can advantageously be combined with the variant embodiment of FIG. 3 and/or the design of the reservoir as illustrated in FIG. 2.

According to a second embodiment of the invention, the heating of the gas at constant volume is implemented outside of the compressed gas storage reservoir and in particular in at least one constant volume heating chamber. The constant volume heating chamber is external to the compressed gas storage reservoir. This embodiment makes it possible to limit the volume of gas to be heated, and to simplify the design of the compressed gas storage reservoir, because it does not need to withstand an increase in the pressure linked to this heating. Only the heating chamber, which has a limited volume, has to withstand this pressure. In order to perform a continuous energy recovery, the system can comprise a plurality of heating chambers in parallel. Thus, while one portion of the gas is heated in a heating chamber, another portion of gas can be introduced into another heating chamber.

The heating of the constant volume heating chamber can be performed totally or partially by the heat transfer fluid used in the heat exchanger, preferably by the heat transfer fluid used in the heat exchanger disposed between the last compression stage and the compressed gas storage. Furthermore, the constant volume heating can be performed partially or totally by an external heat source which for example may be a burner. Thus, raising the temperature to a temperature higher than the temperature that can be supplied by the heat transfer fluid alone is possible.

Figure 5:
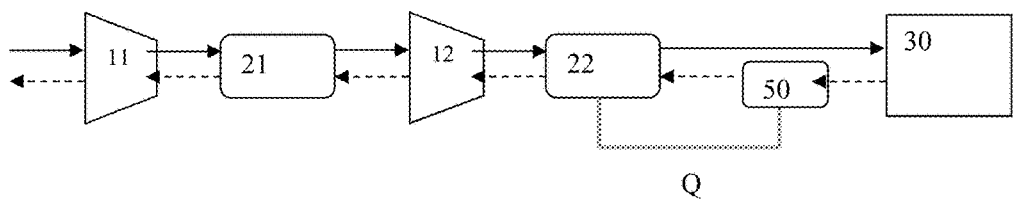
FIG. 5 illustrates a second embodiment according to the invention of the energy storage and recovery system.

FIG. 5 illustrates a non-limiting exemplary embodiment of this second embodiment according to the invention. This figure illustrates an AACAES system with compression stages comprising two compression stages 11 and 12, and two heat exchangers 21 and 22. As illustrated, the compression stages 11 and 12 are reversible and are also used for providing expansion. For the example illustrated, the circulation of the air during the storage of the energy (compression) is represented by a continuous arrow and the circulation of the air during the recovery of the energy (expansion) is represented by a dotted arrow. The system comprises a compressed gas storage reservoir 30. The compression and expansion steps are identical to the conventional compression and expansion steps described in relation to FIG. 1. The heating of the compressed gas at constant volume is performed in a heating chamber 50, by use of an exchange of heat Q with the heat transfer fluid of the second heat exchanger 22. The heating chamber 50 is disposed between the reservoir 30 and the second heat exchanger 22. The heat transfer fluid of the second heat exchanger 22 is hot following the cooling of the gas compressed in the compression phase. During the recovery of the energy (expansion), a part or all of the stored compressed gas is therefore first of all transferred into the heating chamber 50. Then, the gas is heated at constant volume in the heating chamber 50 by an exchange of heat Q with the heat transfer fluid of the second exchanger and the gas can then be heated in the heat exchanger 22. Then, conventionally, the gas passes through one or more expansion stages.

The second embodiment is not limited to the example of FIG. 5 and other configurations can be envisaged including a different number of compression and/or expansion stages and the use of two distinct "circuits" for the compression and the expansion, etc. In addition, the constant volume heating chamber can be of a design similar to the variant embodiment of FIG. 2. Furthermore, the variant embodiments of the first embodiment, in particular the use of a cooler and of a staged heat exchanger, can be combined with the second embodiment according to the invention.

The present invention relates also to a compressed gas storage and recovery method, in which the following steps are performed:
 a) a gas is compressed, in particular by use of an air compressor;
 b) the compressed gas is cooled by heat exchange with a heat transfer fluid, in particular by use of a heat exchanger;
 c) the cooled compressed gas is stored, in particular by use of a compressed gas storage;
 d) the stored compressed gas is heated at constant volume;
 e) an optional step (implemented in particular if, in step d), so that all the heat from the heat transfer fluid is not used) with the stored compressed gas being heated by heat exchange with the heat transfer fluid; and
 f) the heated compressed gas is expanded to generate energy, for example by use of a turbine for generating an electrical energy.

According to an aspect of the invention, the method comprises several successive compression steps, which use air compressors placed in series which are also called staged compressions. In this case, the steps a) and b) are reiterated for each compression stage. Thus, the gas is compressed and cooled several times.

According to a feature of the invention, the method comprises several successive expansion steps, by expansion devices placed in series which is also called staged expansions. In this case, the steps e) and f) are reiterated for each expansion stage. Thus, the gas is heated and expanded several times.

Step a) concerns the compression of a gas, for example air. It can notably be air taken from the ambient environment.

Step b) makes possible cooling the compressed gas after each compression step, which makes it possible optimizing the efficiency of the next compression and/or the storage of energy. Step b) is conventionally performed by use of a heat exchanger. It can in particular be a heat exchanger in which the gas and the heat transfer fluid circulate counter-current. The heat exchanger means possible, during the storage of the compressed gas (compression), recovery of a maximum of heat deriving from the compression of the gas at the output of the compressors and to reduce the temperature of the gas before going on to the next compression or before storage. For example, the compressed gas can go from a temperature higher than 150° C., for example approximately 190° C., to a temperature lower than 80° C., for example approximately 50° C.

Step c) can be performed in a compressed gas storage, which can be a natural or manmade reservoir (for example an underground cavity). The compressed gas storage can be on the surface or underground. Furthermore, it can be formed by a single volume or by a plurality of volumes connected to one another or not. During the storage, the compressed gas storage is closed.

The compressed gas is stored until the time when the stored energy is to be recovered. Step d) and the following steps are performed at the time when the stored energy is to be recovered.

Step d) makes possible heating the stored compressed gas before its passage into the expansion means. Performing the constant volume heating provides an increase in the temperature and the pressure of the gas before the expansion (the induced increase of the pressure can be deduced in particular from the ideal gas law), which allows for an increase in the energy recovered by the system and the method according to the invention. In effect, when there is a desire to obtain mechanical energy from a pressurized hot gas through a turbine, it can be considered that the hot temperature corresponds to the available energy and that the high pressure corresponds to the energy recovery potential. Thus, a constant volume heating (with increased pressure) is more advantageous than a constant pressure heating, as performed in a heat exchanger. In order to avoid the heat losses, this constant volume heating is implemented just before the recovery of energy during the expansion phase, which corresponds to the end of the storage of the compressed gas.

Step e) makes possible heating the compressed air before each expansion, which optimizes the efficiency of the next expansion. Step e) is conventionally performed by a heat exchanger which does not ensure a constant volume during the heat exchange. For the step e), it is possible to use the heat transfer fluid used for cooling in step b). The heat exchanger make it possible during the restoration of the energy, to restore maximum stored heat by increasing the temperature of the gas before the transition to the next expansion. For example, the gas can go from a temperature lower than 80° C., for example approximately 50° C., to a temperature higher than 150° C., for example approximately 180° C.

During step f), the compressed gas is expanded. The expansion of the compressed gas makes possible generation of energy. This expansion can be performed by a turbine which generates electrical energy. If the gas is air, the expanded air can be discharged into the ambient environment.

The constant volume heating can be performed partially or totally by the heat transfer fluid and/or by an external heat source, such as a burner.

According to a first embodiment of the method according to the invention, constant volume heating can be performed in the compressed gas storage reservoir. In this case, it is possible to make the heat transfer fluid circulate in and/or around the compressed gas storage which allows the heat exchange. The gas can then be immobile.

According to a second embodiment of the method according to the invention, this constant volume heating can be performed in a constant volume heating chamber, which is external to the compressed gas storage reservoir. In this case, it is possible to make the heat transfer fluid circulate in and/or around the constant volume heating chamber, so as to allow the heat exchange. The gas can then be stationary.

The method according to the invention can be implemented by the system according to any of the embodiments of the invention described previously includes with or without the use of an additional cooler for cooling the compressed gas more before its storage, and/or with or without the use of a staged heat exchanger for a staged heating of the compressed gas and/or with or without the use of a cylindrical reservoir with inner and/or outer cylinder in which the heat transfer fluid circulates, to increase the heat exchange.

The method and the system according to the invention can be used for the storage of an intermittent energy, such as from a wind turbine or solar energy, in order to delay using the stored energy at the desired time.

The invention claimed is:

1. A compressed gas energy storage and recovery system comprising:
at least one compressor for compressing the gas, a storage providing constant volume storage of the compressed gas, a first heat exchanger located outside the storage for cooling the compressed gas with a heat transfer fluid which absorbs heat from the compressed gas, a heater for heating the stored compressed gas at constant volume; and at least one expansion device for expanding the compressed gas after heating for generating energy, and wherein
the heater for heating the compressed gas at constant volume is located in the storage and the heating of the stored compressed gas in the storage is at least partially performed by heat transfer between heat transfer fluid and the compressed gas and the heater for heating the stored compressed gas comprises a second heat exchanger exchanging heat between the stored compressed gas and the heat transfer fluid of the first heat exchanger.

2. The system as claimed in claim 1, wherein the storage for the compressed gas comprises at least one cylindrical reservoir comprising at least one of an inner and an outer cylinder in which the heat transfer fluid circulates.

3. The system as claimed in claim 1, wherein the heat exchanger for the compressed gas comprises stages with each stage storing at least the heat transfer fluid at a different temperature than a storage temperature of that heat transfer fluid in remaining stages, for heating the compressed gas successively with the heat transfer fluid stored at different temperatures.

4. The system as claimed in claim 1, wherein the constant volume heater comprises a heat exchanger having an external heat source.

5. The system as claimed in claim 1, wherein the compressed gas storage includes storage volumes which are connected together.

6. The system as claimed in claim 1, wherein the expansion device is reversible and when reversed is used as a compressor.

7. The system as claimed in claim 1, comprising compressors between which are disposed a heat exchanger and expansion devices between which is disposed a heat exchanger.

8. The system as claimed in claim 1, the first heat exchanger operates at constant pressure.

9. A compressed gas energy storage and recovery method comprising:
a) compressing gas;
b) cooling the compressed gas by heat exchange with a heat transfer fluid to produce heated heat transfer fluid;
c) storing the cooled compressed gas in a constant volume gas storage;
d) heating the stored compressed gas in the storage at constant volume with the heating being performed at least partially by heat exchange between the heated heat transfer fluid and the compressed gas stored at constant volume; and
e) expanding the compressed gas heated with the heat transfer fluid to generate energy.

10. The method as claimed in claim 9, wherein the heating of the gas at constant volume includes circulating the transfer fluid in a cylindrical compressed gas storage reservoir.

11. The method as claimed in claim 9, comprising heating the gas at constant volume with an external heat source.

12. The method as claimed in claim 9, wherein the compressing and the cooling of the gas is repeated in compressors and heat exchangers with the heat transfer fluid and the expanding being repeated by expansion devices and heat exchangers with the heated transfer fluid.

13. The method as claimed in claim 9 comprising storing the heated transfer fluid.

14. The method as claimed in claim 9, comprising cooling the compressed gas in stages by storing the heated transfer fluid at different temperatures in each stage and the constant volume heating is performed by successive heat exchangers with the heat transfer fluid at different temperatures.

* * * * *